United States Patent [19]

Dehu et al.

[11] Patent Number: 5,277,020
[45] Date of Patent: Jan. 11, 1994

[54] HYDRAULICALLY ACTUATED AIRCRAFT ENGINE CONTROL SYSTEM

[75] Inventors: Michel P. Dehu, La Chapelle Rablais; Pierre Hebert, Crosne; Guy R. E. Hebraud, Vaux le Penil; Eric C. Pean, Chennevieres, all of France

[73] Assignee: Societe Nationale d'Etude et de Construction de Motors d'Aviation, Paris, France

[21] Appl. No.: 998,597

[22] Filed: Dec. 30, 1992

[30] Foreign Application Priority Data

Dec. 31, 1991 [FR] France .................. 91 16359

[51] Int. Cl.⁵ .................................. B64C 13/36
[52] U.S. Cl. ........................... 60/39.33; 60/405; 244/53 R; 244/78
[58] Field of Search ............... 60/39.33, 403, 405; 244/53 R

[56] References Cited

U.S. PATENT DOCUMENTS

| | | | |
|---|---|---|---|
| 3,527,143 | 9/1970 | Hayter | 244/78 |
| 3,662,550 | 5/1972 | Lichtfuss | 60/405 |
| 3,851,721 | 12/1974 | Comer, Jr. et al. | 60/405 |
| 3,952,510 | 4/1976 | Peterson | 60/405 |
| 4,428,196 | 1/1984 | Boehringer | 244/78 |
| 4,533,097 | 8/1985 | Aldrich | 244/78 |
| 4,711,089 | 12/1987 | Archung | 60/405 |
| 5,100,082 | 3/1992 | Archung | 244/78 |

FOREIGN PATENT DOCUMENTS 0307974  3/1989  European Pat. Off.
1557706  12/1979  United Kingdom.

Primary Examiner—Richard A. Bertsch
Assistant Examiner—Michael I. Kocharov
Attorney, Agent, or Firm—Bacon & Thomas

[57] ABSTRACT

A control system for hydraulically controlling variable engine structures is disclosed in which the control system utilizes hydraulic fluid identical to that used by the aircraft hydraulic control circuit. A high pressure hydraulic pump, driven by the aircraft engine, may be interconnected with the aircraft hydraulic control circuit, or may be associated with a separate fluid reservoir, to supply pressurized hydraulic fluid to the actuators for controlling the variable engine structures. The engine control circuit also includes a hydraulic pressure modulator to modulate the pressure of the fluid supplied to the actuator and a selector connected between the high pressure pump and, the modulator and the aircraft control circuit to selectively supply the high pressure hydraulic fluid from the pump to either the engine control circuit, or to the aircraft control circuit. An electronic control system, which may comprise the aircraft computer, controls the operation of the selector as well as other parameters of the system.

6 Claims, 1 Drawing Sheet

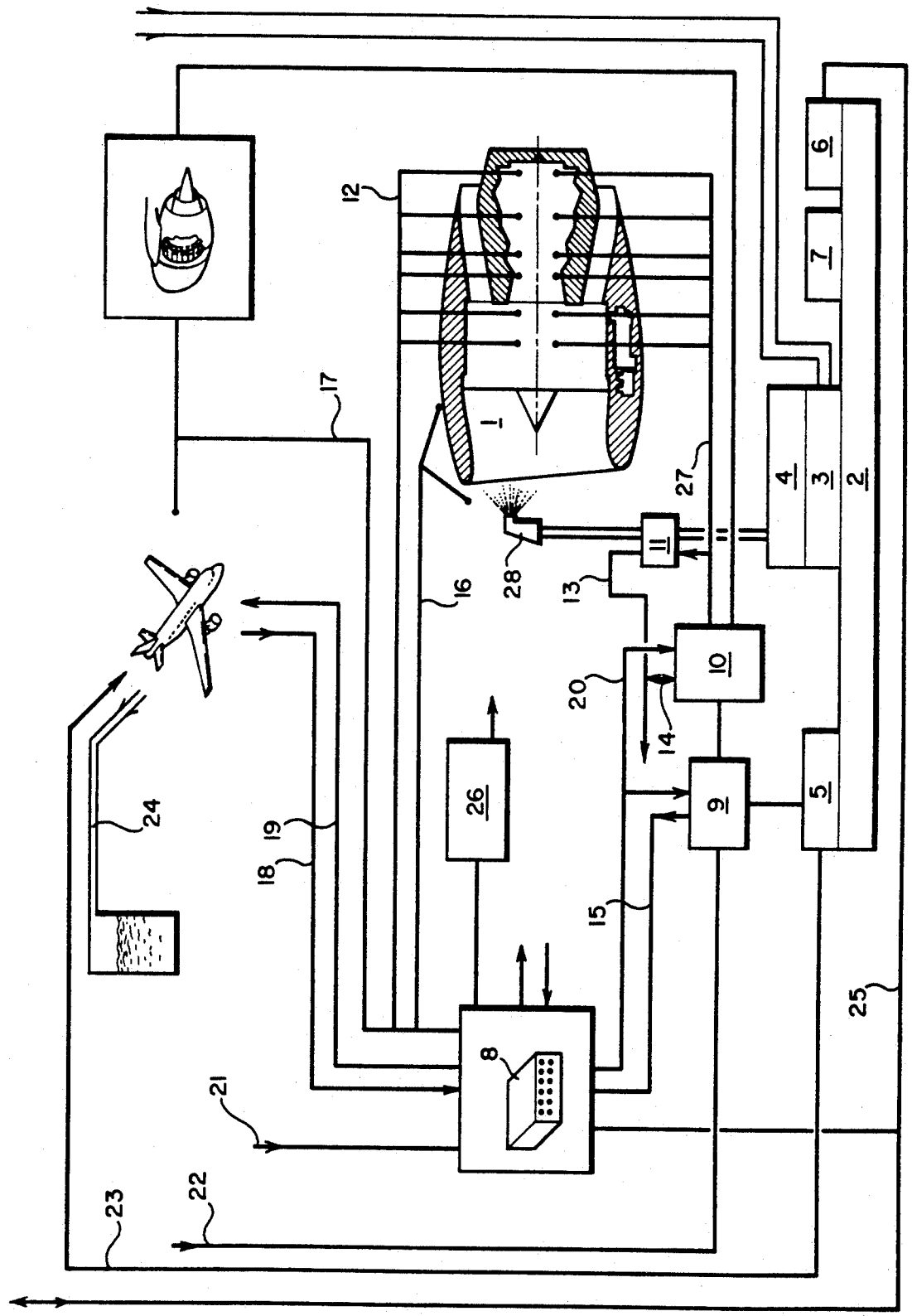

HYDRAULICALLY ACTUATED AIRCRAFT ENGINE CONTROL SYSTEM

BACKGROUND OF THE INVENTION

The present invention relates to a hydraulically actuated aircraft engine control system, more particularly such a system interconnected with the aircraft hydraulic control system.

Present day aircraft gas turbine engines are highly sophisticated and, in order to improve their performance in regard to both thrust and fuel consumption, they include systems for controlling variable position compressor stators, variable geometry of the intake casing and devices to control and minimize the clearances between the stationary and rotating portions of their turbines and compressors.

Typically, these items are controlled by actuators in which the motive power is generated by pressurized fuel. The supply of pressurized fuel is delivered to the engine by one or more fuel pumps such that a portion of the fuel is supplied to and burned in the combustion chamber of the engine, while another portion of the pressurized fuel is directed to the control actuators and servo circuits for the variable engine structures. Unused fuel is directed by a control valve to the upstream side of a low pressure fuel pump. Any malfunction of the servo circuit of the gas turbine engine will cause engine stoppage, thereby making it impossible to drive the actuators for the variable engine structures and the rotor/stator control actuators.

Modern aircraft typically have at least one hydraulic control circuit for controlling the aircraft control surfaces, the operation of the landing gear, etc. with an independent pressurized fluid source which delivers a pressurized hydraulic fluid to the control circuit to control these structures. The hydraulic fluid used in the aircraft hydraulic control circuit typically is incompressible and non-flammable and may be subjected to a substantially higher pressure than the fuel for the gas turbine engine.

SUMMARY OF THE INVENTION

A control system for hydraulically controlling variable engine structures is disclosed in which the control system utilizes hydraulic fluid identical to that used by the aircraft hydraulic control circuit. A high pressure hydraulic pump, driven by the aircraft engine, may be interconnected with the aircraft hydraulic control circuit, or may be associated with a separate fluid reservoir, to supply pressurized hydraulic fluid to the actuators for controlling the variable engine structures. The engine control circuit also includes a hydraulic pressure modulator to modulate the pressure of the fluid supplied to the actuator and a selector connected between the high pressure pump, the modulator and the aircraft control circuit to selectively supply the high pressure hydraulic fluid from the pump to either the engine control circuit, or to the aircraft control circuit. An electronic control system, which may comprise the aircraft computer, controls the operation of the selector as well as other parameters of the system.

The use of an engine control system with hydraulic fluid identical to that of the aircraft control system provides a redundancy for both control circuits. Should a malfunction occur in the supply for the engine control circuit, the selector may be actuated so as to supply hydraulic fluid from the aircraft control circuit in order to control the variable engine structures. Conversely, hydraulic fluid from the engine control circuit can also be supplied to the aircraft control circuit should that circuit encounter a supply malfunction.

The electronic computer may also have inputs from engine sensors so that it may continually issue commands to the power and servo actuators for the engine in order to optimize the engine performance.

The use of a non-flammable fluid to control the engine actuators improves the safety of the aircraft, while at the same time improving the efficiency of the aircraft engine. Since the hydraulic fluid is incompressible, it is able to more accurately actuate the servo devices in the engine control circuit. Since the hydraulic pressure is higher with the hydraulic fluid than with the fuel, then individual actuators can be made smaller and lighter, thereby reducing the weight of the engine. Flow from the fuel pumps can be reduced, since fuel is no longer needed for actuating the aircraft engine control servos, thereby enabling the fuel pumps to be made smaller and lighter. Also, the hot-fuel return loop from the engine to the aircraft tanks can be decreased, or eliminated altogether. Local pressure generators can be eliminated along with their connecting conduits.

The hydraulic circuit used to control the variable engine structures is a closed circuit, thereby reducing the possibility of pollution of the hydraulic fluid caused by foreign bodies. The use of a such a closed system enables the quantity of hydraulic fluid filters to be reduced, further reducing the weight of the aircraft engine.

Engine maintenance is also rendered easier by the use of this invention because the variable engine structures can be controlled and tested while the engine is not running, thereby making it possible to check the proper operation of the engine control actuators without causing undue wear on the engine.

The operation of the variable engine structures is independent of engine operation and they are no longer dependent upon the mode of engine operation. This increases the operational reliability of the aircraft by permitting the lowering of the rotational speed of the engine in order to attain re-ignition.

Finally, the size of the fuel pump is no longer related to the combustion determined fuel flow, thereby increasing the efficiency and making possible the reduction and possible elimination of fuel heat exchangers.

BRIEF DESCRIPTION OF THE DRAWING

The single FIGURE is a schematic diagram illustrating the hydraulically actuated aircraft engine control system according to the present invention.

DETAILED DESCRIPTION OF A PREFERRED EMBODIMENT

By known means, such as a drive shaft (not shown), the aircraft engine 1 drives an equipment box or gear box 2, which, in turn, drives a low pressure fuel pump 3, a high pressure fuel pump 4, a high pressure hydraulic pump 5, an alternator-starter 6 and a lubrication device 7 for the aircraft engine 1. The aircraft electric circuit is connected to the hydraulic control system according to the present invention at 21, while the aircraft hydraulic control circuit, which is utilized to actuate the aircraft components, such as control surfaces, landing gear, etc. is connected to the engine control system at 22. The aircraft hydraulic control circuit uses an incompressible and non-flammable hydraulic fluid, such as SKYDROL, at a pressure higher than that of the fuel pressure delivered by high pressure fuel pump 4. The control and servo circuit of the engine 1 is indicated at 27, while 24 schematically denotes the return circuit to the engine or aircraft reservoir.

The engine control system utilizes an electronic control, which may be computer 8, as well a hydraulic circuit selector 9 which is operatively interposed between the high pressure hydraulic pump 5 and the hydraulic pressure modulator 10. The modulator 10 modulates the pressure of the hydraulic fluid supplied to the control and servo circuit 27. The computer 8 may also control other equipment associated with the engine or the aircraft, such as thrust reversers, etc. in known fashion.

Hydraulic circuit selector 9 is operatively associated between the high pressure hydraulic pump 5 and the hydraulic pressure modulator 10, and is also connected to the aircraft hydraulic control circuit 22. Pump 5 may also be connected to the aircraft via line 23. The selector 9 is controlled by the computer 8, which determines whether hydraulic fluid from the high pressure hydraulic pump 5, or from the aircraft hydraulic circuit 22, should be delivered to the modulator 10 and, consequently, the engine control circuit 27. Since the hydraulic fluid utilized in the hydraulic circuit 27 is identical with the hydraulic fluid utilized in the aircraft hydraulic circuit 22, these systems may be interchangeably used and provide redundant backups for each other. This redundancy is provided by connecting the high pressure hydraulic pump 5 with the aircraft hydraulic circuit 22 through the selector 9 so that the pump 5 can supply pressurized hydraulic fluid to the aircraft control circuit 22 should this become necessary.

A flow meter 11 is operatively interposed between the high pressure fuel pump 4 and fuel injectors 28 which are, in known fashion, arrayed in the combustion chamber of the engine 1. The fuel meter 11 may be controlled by either the hydraulic fluid from the engine control circuit 27, or by the fuel. The computer 8 is connected to position sensors 12 which sense the positions of the variable engine structures, and to the position sensor 13 which senses the position of the fuel meter 11. Computer 8 is also connected to position sensor 14 of the hydraulic pressure modulator 10, the position sensor 15 for the hydraulic circuit selector 9, to various temperature and pressure sensors 16 of the engine 1, to sensors 17 and 18 associated with the aircraft and the engine casing, as well as two actuators 19 and 20 for the aircraft and the engine assembly, respectively.

Electric circuit 25 connects the aircraft electric power supply 21 to the alternator-starter 6 and to the computer 8 and thereby allows the power to be supplied to the starter 6 in order to start the engine 1 and to supply power to the computer 8 in normal operation. Computer 8 may also, in known fashion, control the engine ignition control, schematically illustrated at 26.

The foregoing description is provided for illustrative purposes only and should not be construed as in any way limiting this invention, the scope of which is defined solely by the appended claims.

We claim:

1. A control system for hydraulically controlling variable engine structures of at least one engine attached to an aircraft having a hydraulic control circuit with a hydraulic fluid controlling aircraft structures comprising
    a) a high pressure hydraulic means driven by the at least one engine, the high pressure hydraulic means having an outlet through which issues pressurized hydraulic fluid identical to the hydraulic fluid in the aircraft hydraulic control circuit;
    b) hydraulically actuated engine control means operatively associated with the at least one engine to control variable operating structures of the at least one engine;
    c) hydraulic pressure modulator means operatively associated with the high pressure hydraulic means and the engine control means so as to supply modulated high pressure hydraulic fluid to the engine control means;
    d) hydraulic circuit selector means operatively interposed between the aircraft hydraulic control circuit, the high pressure hydraulic means and the hydraulic pressure modulator means; and,
    e) control means operatively associated with the selector means to actuate the selector means such that hydraulic fluid from the high pressure hydraulic means or from the aircraft hydraulic control circuit is supplied to the hydraulic pressure modulator means.

2. The control system of claim 1 wherein the control means comprises computer means operatively associated with the hydraulic circuit selector means.

3. The control system of claim 2 further comprising position sensor means operatively associated with the variable engine structures and the computer means.

4. The control system of claim 1 wherein the high pressure hydraulic means is operatively associated with the aircraft hydraulic control circuit.

5. The control system of claim 4 wherein the high pressure hydraulic means comprises a high pressure pump.

6. The control system of claim 1 wherein the high pressure hydraulic means comprises a high pressure pump.

* * * * *